US007063045B2

(12) United States Patent
Van Meter

(10) Patent No.: US 7,063,045 B2
(45) Date of Patent: Jun. 20, 2006

(54) LEASH WITH INTEGRATED POCKET

(76) Inventor: Caroline C. Van Meter, 340 Kingsway Dr., Lexington, KY (US) 40502

( * ) Notice: Subject to any disclaimer, the term of this patent is extended or adjusted under 35 U.S.C. 154(b) by 0 days.

(21) Appl. No.: 10/916,204

(22) Filed: Aug. 11, 2004

(65) Prior Publication Data

US 2005/0087147 A1 Apr. 28, 2005

Related U.S. Application Data

(60) Provisional application No. 60/514,786, filed on Oct. 27, 2003.

(51) Int. Cl.
A01K 27/00 (2006.01)
A45C 13/30 (2006.01)

(52) U.S. Cl. .............. 119/795; 119/858; 119/867; 150/138; 150/144; 150/900; 150/109

(58) Field of Classification Search ........... 119/795, 119/792, 858, 863, 865, 856, 867; 150/138, 150/144, 150, 151, 900, 131, 109
See application file for complete search history.

(56) References Cited

U.S. PATENT DOCUMENTS

| | | | | |
|---|---|---|---|---|
| 3,009,614 A * | 11/1961 | Humphner | .............. | 224/219 |
| 3,604,232 A * | 9/1971 | Mosher | .............. | 70/457 |
| 4,031,859 A * | 6/1977 | Stewart | .............. | 119/654 |
| 4,341,331 A * | 7/1982 | McDougall | .............. | 224/219 |
| 4,896,465 A * | 1/1990 | Rhodes et al. | .............. | 451/523 |
| 5,199,383 A | 4/1993 | Lagana | | |
| 5,233,942 A * | 8/1993 | Cooper et al. | .............. | 119/792 |
| 5,318,084 A * | 6/1994 | Jackson | .............. | 150/109 |
| 5,467,743 A * | 11/1995 | Doose | .............. | 119/864 |
| 5,497,733 A | 3/1996 | Hull | | |
| D373,900 S * | 9/1996 | Montgomery, Sr. | .............. | D3/226 |
| 5,551,496 A * | 9/1996 | Gray, Jr. | .............. | 150/134 |
| 5,558,440 A * | 9/1996 | Miller | .............. | 383/87 |
| 5,727,500 A * | 3/1998 | Conboy | .............. | 119/174 |
| 5,766,235 A * | 6/1998 | Kostopoulos | .............. | 607/114 |
| 5,832,879 A * | 11/1998 | Pitzen | .............. | 119/858 |
| D404,908 S * | 2/1999 | Lollis | .............. | D3/215 |
| 5,887,772 A * | 3/1999 | Dooley | .............. | 224/191 |
| 5,890,637 A * | 4/1999 | Furneaux | .............. | 224/191 |
| 5,899,369 A * | 5/1999 | Macripo | .............. | 223/111 |
| 5,970,921 A * | 10/1999 | Fulton | .............. | 119/858 |
| D425,266 S * | 5/2000 | Rubinstein | .............. | D30/153 |
| 6,073,590 A * | 6/2000 | Polding | .............. | 119/795 |
| 6,112,961 A * | 9/2000 | Phillips | .............. | 224/222 |
| 6,200,243 B1 * | 3/2001 | Meranto | .............. | 482/105 |
| 6,223,958 B1 * | 5/2001 | Kohn | .............. | 224/219 |
| 6,286,463 B1 * | 9/2001 | Sykes | .............. | 119/858 |
| 6,321,957 B1 * | 11/2001 | Rossi | .............. | 224/221 |

(Continued)

FOREIGN PATENT DOCUMENTS

GB 2209928 A * 1/1989

Primary Examiner—Yvonne R. Abbott
(74) Attorney, Agent, or Firm—Stoll Keenon Ogden, PLLC

(57) ABSTRACT

An animal leash including an integrated, selectively accessible cavity, the animal leash comprising: (a) a first elongated strap; and (b) a first collapsible wall attached to the first elongated strap to form an integrated receptacle, the integrated receptacle including an opening providing access to an interior thereof, the integrated receptacle further including a reconfigurable closure adapted to be selectively reconfigured to restrict access to the interior of the integrated receptacle.

7 Claims, 3 Drawing Sheets

U.S. PATENT DOCUMENTS

| | | |
|---|---|---|
| 6,418,881 B1 | 7/2002 | Starratt |
| 6,422,177 B1 * | 7/2002 | Noguero ..................... 119/856 |
| 6,443,101 B1 | 9/2002 | Fazio |
| 6,450,129 B1 * | 9/2002 | Flynn ......................... 119/770 |
| 6,497,198 B1 * | 12/2002 | Evans ......................... 119/858 |
| 6,516,748 B1 * | 2/2003 | Jackson ........................ 119/72 |
| 6,568,574 B1 * | 5/2003 | Jones et al. ................. 224/222 |
| 6,626,131 B1 | 9/2003 | Moulton |
| 6,684,543 B1 * | 2/2004 | Fernau ......................... 40/636 |
| 6,789,671 B1 * | 9/2004 | Morrison et al. ........... 206/388 |

\* cited by examiner

LEASH WITH INTEGRATED POCKET

CROSS REFERENCE TO RELATED APPLICATIONS

This application claims the benefit of U.S. Provisional Patent Application Ser. No. 60/514,786, filed Oct. 27, 2003, and entitled "LEASH WITH BUILT-IN POCKET," the disclosure of which is incorporated herein by reference.

BACKGROUND

1. Field of the Invention

The present invention is directed to an animal leash having an integrated pocket for receiving articles to be fastened thereto or secured therein.

2. Relevant History

Animal leashes are well known in the art. An exemplary animal leash may comprise something as simple as a piece of rope having a first end thereof secured to the animal and an opposing second end thereof coupled to a person or mounted to a fixed object. More elaborate leashes may be manufactured from metal links or from stitched or braided materials. Regardless of the structure, the leash provides a limited range of freedom for an animal. Often, this limited range of freedom is for the safety of the animal.

One of the more common applications of a leash is involved with walking a dog. It is particularly cumbersome to carry keys, a telephone, or other device in one hand while carrying the leach in the other hand, or attempting to do both with the same hand. Most often, this requires carrying a backpack or having clothing with sufficient storage, such as pockets, to secure such an article therein.

Therefore, there is a need in the art to provide the functionality of a leash concurrently with the carrying capacity of a pocket to alleviate the requirement of a person carrying keys, a telephone, or other device in his/her hand when wearing clothing with insufficient pocket storage. Still further, there is a need in the art to integrate the pocket with the leash to provide a storage compartment that is not prone to separation from the leash.

SUMMARY

The present invention is directed to an animal leash having a pocket for receiving articles to be fastened thereto or secured therein. More specifically, the present invention is directed to an animal leash that includes an integral compartment for containing useful articles that may include, without limitation, keys, money, identification, a telephone, and plastic bags.

DETAILED DESCRIPTION

The exemplary embodiments of the present invention are described and illustrated below to encompass methods for carrying articles and devices for facilitating such methods. More specifically, the present invention provides an animal leash that includes an integrated pocket for storage of articles. Of course, it will be apparent to those of ordinary skill in the art that the preferred embodiments discussed below are exemplary in nature and may be reconfigured without departing from the scope and spirit of the present invention. However, for clarity and precision, the exemplary embodiments discussed below may include optional steps and/or features that one of ordinary skill will recognize as not being a requisite to fall within the scope of the present invention. In addition, for purposes of brevity, the following description has omitted an exhaustive listing of animals with which use of the present invention may be particularly advantageous.

Figure 1:
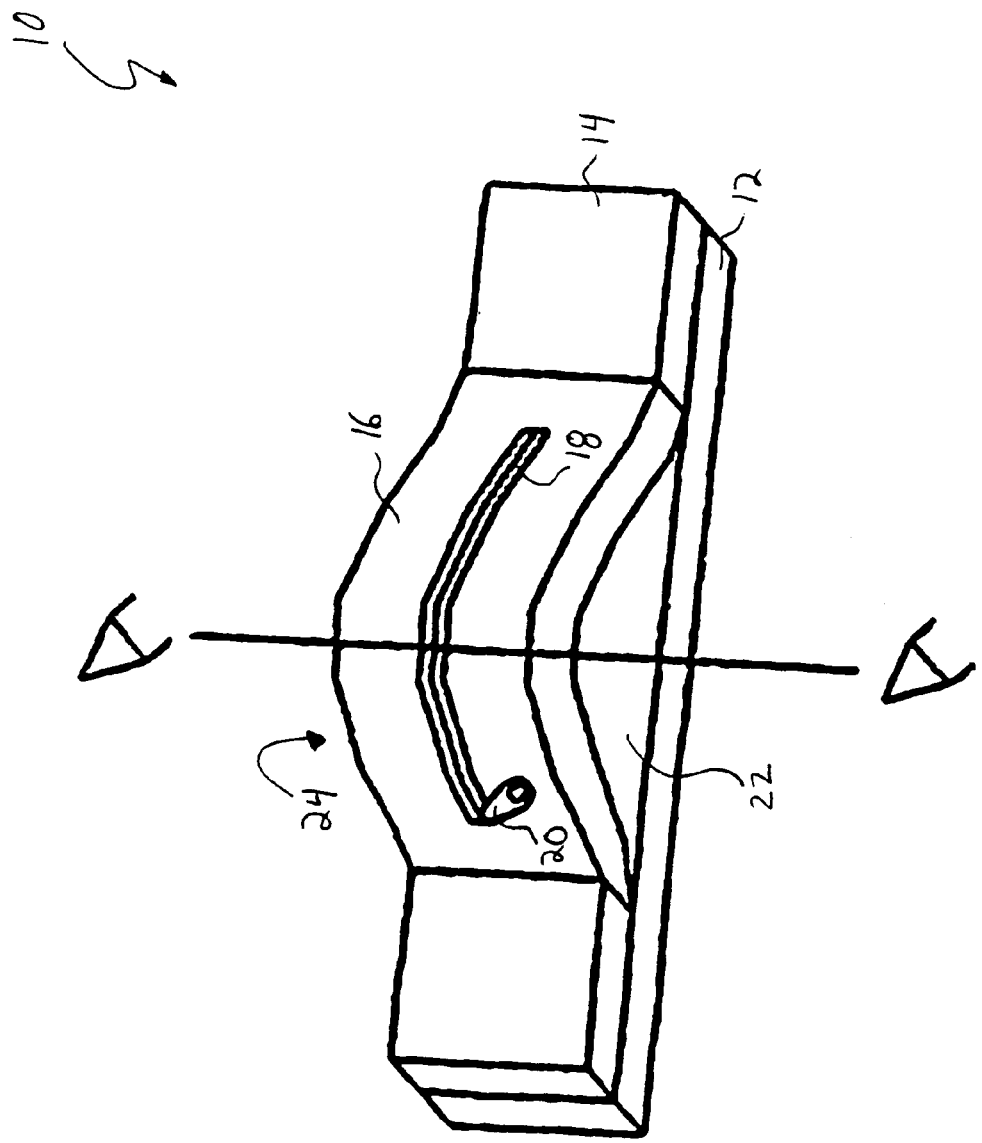
FIG. 1 is an elevated perspective view of a segment of a first exemplary embodiment of the present invention.

Referencing FIG. 1, a first exemplary segment 10 of a first exemplary embodiment of the present invention includes a first elongated strap 12 secured to a second elongated strap 14 in a parallel back-to-back fashion. The second strap 14 has an unattached segment 16 where there is a gap between the first strap 12 and the second strap 14. The unattached segment 16 includes a vertical slit 18 running lengthwise and extending therethrough that includes a closure such as a zipper 20 attached thereto to provide selective access through the slit 18. Other exemplary closures include, without limitation, loop and pile fasteners, buttons, snaps, and hook and loop fasteners. Collapsible side walls 22, 24 are interposed between the first strap 12 and the second strap 14 in the gap formed by the unattached segment 16 to define an enclosure 26 (see FIG. 2).

Figure 2:
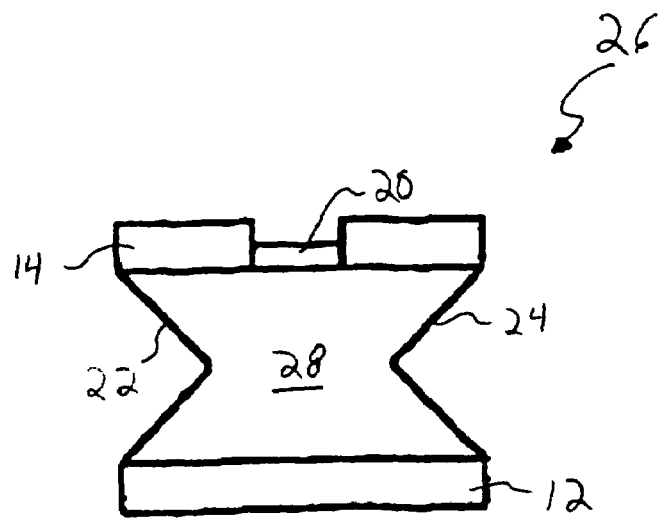
FIG. 2 is a cross-sectional view taken along line A—A of FIG. 1.

Referring to FIG. 2, the collapsible walls 22, 24 are concurrently mounted between the first strap 12 and the second strap 14 to provide the enclosure 26 defining a cavity 28 for storing articles therein. Exemplary mounting techniques for securing the first strap 12 to the second strap 14 and securing the collapsible walls 22, 24 thereto are known by those of ordinary skill in the art and include, without limitation, stitching and adhesive. In this exemplary embodiment, the collapsible walls 22, 24 comprise an expandable fabric such as, without limitation, spandex, while the first strap 12 and the second strap 14 may comprise a durable fabric such as, without limitation, nylon.

Referencing FIGS. 1 and 2, the first exemplary segment 10 may comprise a portion of a dog leash or other animal leash. Municipal regulations and/or good etiquette may require that the person walking the animal remove fecal material deposited as a result of defecation. Thus, it may be advantageous to utilize the enclosure 26 to secure a plastic bag, glove, and other materials advantageous for fecal material removal. In an exemplary process, the zipper 20 may be manipulated vertically to enable articles to pass through the slit 18 and likewise be manipulated vertically to inhibit articles from passing through the slit 18 when it is desirous to retain such articles within the enclosure 26. Other articles that may be stored within the enclosure 26 include, without limitation, keys, money, credit cards, personal identification, a portable telephone, animal treats, and a whistle.

As shown in FIGS. 1 and 2, assembly and fabrication of the first exemplary segment 10 includes cutting the slit 18 within the unattached segment 16 of the second strap 14. The zipper 20 is secured to the perimeter of the slit 18 to provide for selective throughput of articles through the slit 18. The opposing collapsible walls 22, 24 are mounted to the first strap 12 and the second strap 14 and thereafter, the straps 12, 14 are aligned and secured together to form the cavity 28 which is bounded by the collapsible walls 22, 24 and the straps 12, 14. However, it is within the scope of the invention that the straps 12, 14 and/or collapsible walls 22, 24 comprise a single piece of material.

Figure 4:
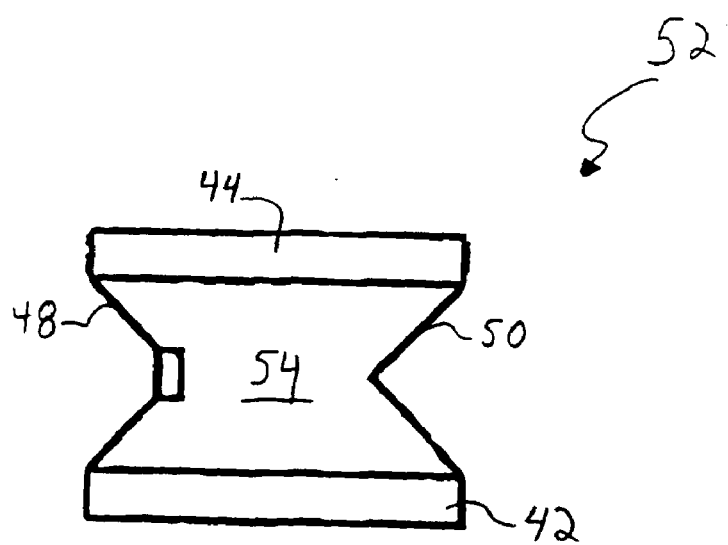
FIG. 4 is a cross-sectional view taken along line B—B of FIG. 3.
Figure 3:
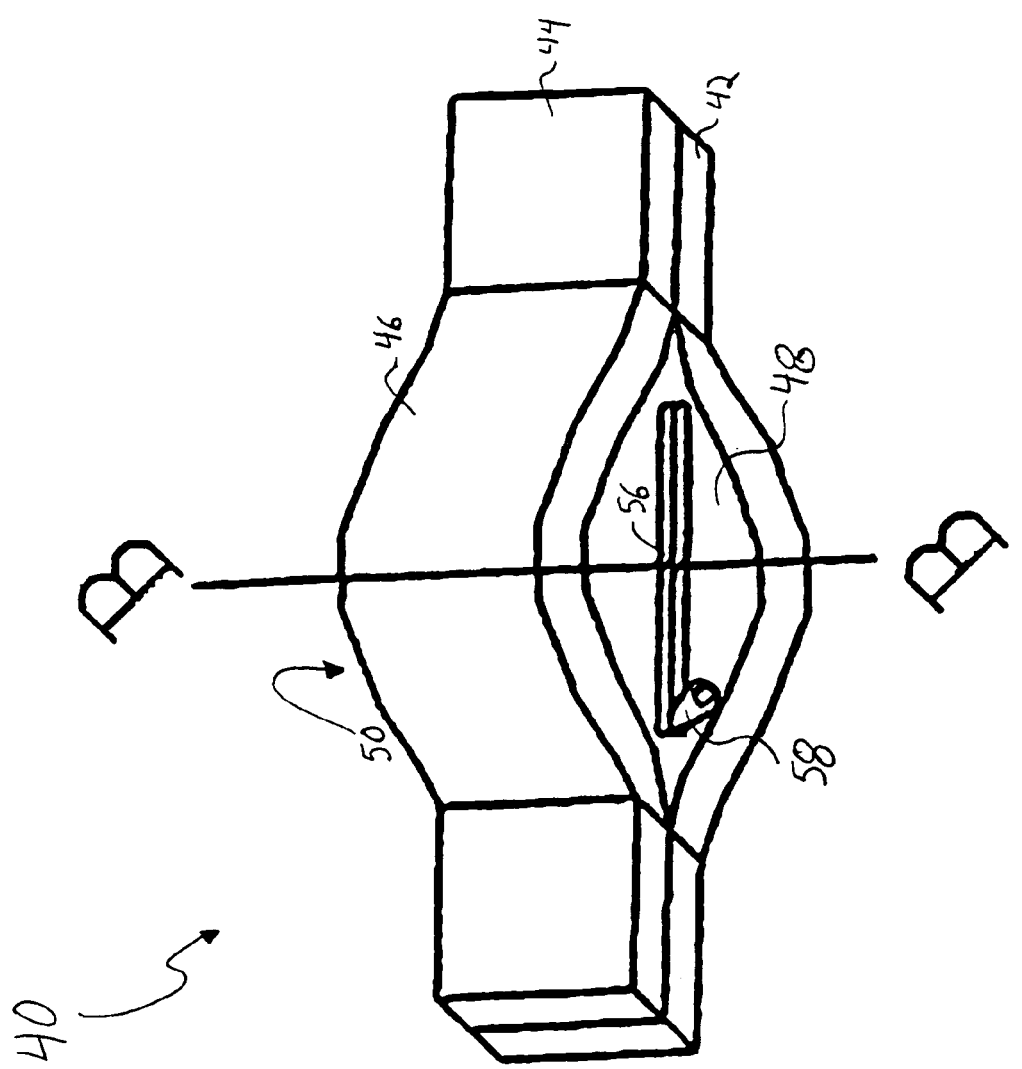
FIG. 3 is an elevated perspective view of a segment of a second exemplary embodiment of the present invention.

Referencing FIGS. 3 and 4, a second exemplary segment 40 of a second exemplary embodiment of the present invention includes a first strap 42 secured to a second strap 44 and having an unattached region 46 to which the first strap 42 is not directly mounted to the second strap 44. A portion of the first strap 42, a portion of the second strap 44, and the opposing collapsible walls 48, 50 mounted between the first strap 42 and the second strap 44 comprise an enclosure 52 that defines a cavity 54 therein. Access to the cavity 54 is provided by a vertical slit 56 running lengthwise along the segment 40 within at least one of the collapsible walls 48, 50. A zipper 58 attached to at least one of the collapsible walls 48, 50 provides selective access through the slit 56 and into the cavity 54.

Referring to FIG. 4, the collapsible walls 48, 50 are concurrently mounted to the first strap 42 and the second strap 44 defining the cavity 54 available for storing articles therein. Exemplary mounting techniques for securing the first strap 42 to the second strap 44 and securing the collapsible walls 48, 50 thereto are known by those of ordinary skill in the art and include, without limitation, stitching and adhesive. In this exemplary embodiment, the collapsible walls 48, 50 may comprise an expandable fabric, and the first strap 42 and the second strap 44 may comprise a durable fabric.

Referencing FIGS. 3 and 4, the second exemplary segment 40 may comprise a portion of a dog leash or other animal leash. Municipal regulations and/or good etiquette may require that the owner or person leading or holding the animal in check remove fecal material deposited as a result of defecation. Thus, it may be advantageous to utilize the cavity 54 to secure a plastic bag, glove, and other materials advantageous for fecal material removal therein. In an exemplary process, the zipper 58 would be manipulated vertically to enable articles to pass through the slit 56 and likewise be manipulated vertically to prohibit articles to pass through the slit 56. As discussed above, other articles that may be stored within the cavity 54 and include, without limitation, keys, money, credit cards, personal identification, animal treats, and a whistle.

As shown in FIGS. 3 and 4, assembly and fabrication of the second exemplary segment 40 includes cutting the slit 56 within one of the collapsible walls 48, 50. The zipper 58 is secured to the perimeter of the slit 56 to provide for selective throughput of articles through the slit 58. The collapsible walls 48, 50 are mounted to first strap 42 and the second strap 44 and thereafter, the straps 42, 44 are aligned and secured together to form the cavity 54 which is bounded by the collapsible walls 48, 50 and the straps 42, 44.

In each of the above exemplary segments 10, 40, the cavity 28, 54 is in series with the leash such that tension on the leach stretches the segments to collapse the cavity and more tightly secure any contents therein. It is to be understood that this feature is not required to fall within the scope of the present invention. When the cavity 28, 54 is not used to store articles, however, the profile of the leash may generally match the profile of an ordinary leash.

It is further within the scope and spirit of the present invention that the segments 10, 40 may be incorporated into pre-existing leashes or may be integrated into new leashes. Further, the segments 10, 40 may be integrated into retractable leashes, roll-up leashes, or other space conscious leash systems. Such leashes may include clips for coupling to a dog collar and an optional handle (such as a loop at the end of the leash).

It is also within the scope of the present invention that the segments 10, 40 be incorporated into animal collars or animal harnesses. Those of ordinary skill will readily understand the applicability of these exemplary segments 10, 40 to provide secure cavities for storing articles therein.

Following from the above description and invention summaries, it should be apparent to those of ordinary skill in the art that, while the methods and apparatuses herein described constitute exemplary embodiments of the present invention, the invention contained herein is not limited to this precise embodiment and that changes may be made to such embodiments without departing from the scope of the invention as defined by the claims. Additionally, it is to be understood that the invention is defined by the claims and it is not intended that any limitations or elements describing the exemplary embodiments set forth herein are to be incorporated into the interpretation of any claim element unless such limitation or element is explicitly stated. Likewise, it is to be understood that it is not necessary to meet any or all of the identified advantages or objects of the invention disclosed herein in order to fall within the scope of any claims, since the invention is defined by the claims and since inherent and/or unforeseen advantages of the present invention may exist even though they may not have been explicitly discussed herein.

What is claimed is:

1. An animal leash including an integrated, selectively accessible storage receptacle, the animal leash comprising:
   a first elongated strap;
   a first collapsible wall attached to the first elongated strap to cooperatively form an integrated receptacle, said integrated receptacle and extending generally parallel to said strap and providing access to an interior of said integrated receptacle;
   a second elongated strap attached to the first elongated strap in a parallel fashion, and a second collapsible wall attached between the first elonanted strap and the second elongated strap and opposing the first collapsible wall attached between an unattached segment of the first elongated strap and the second elongated strap; and
   a reconfigurable closure adapted to be selectively reconfigured to restrict access to the interior of the integrated receptacle.

2. The animal leash of claim 1, wherein the reconfigurable closure is repositionable to provide a range of access to the integrated receptacle.

3. The animal leash of claim 1, wherein the reconfigurable closure resides at least in part on at least one of the first elongated strap and the second elongated strap.

4. The animal leash of claim 1, wherein the reconfigurable closure includes at least one of a loop and pile fastener, a button, a snap, a hook and loop fastener, and a zipper.

5. The animal leash of claim 1, wherein the integrated receptacle is in series with the animal leash.

6. A collapsible compartment integral with an animal leash, said compartment comprising:
   a wall portion attached to a portion of said leash to cooperatively form an integrated storage compartment; and an access opening formed in said integrated storage comparnent and extending generally parallel to said leash and operative to vary the size of the access opening dependant at least in part upon a tension upon the leash such that the access opening is generally larger when the leash is slack and the access opening is generally smaller when the leash is taut.

7. The collapsible compartment of claim 6, wherein:
   the housing is formed with a closure mounted in proximity to the opening to impart a selective accessibility function; and
   the closure includes at least one of a loop and pile fastener, a button, a snap, a hook and loop fastener, and a zipper.

* * * * *